(12) United States Patent
Zhang et al.

(10) Patent No.: US 11,099,999 B2
(45) Date of Patent: Aug. 24, 2021

(54) CACHE MANAGEMENT METHOD, CACHE CONTROLLER, PROCESSOR AND STORAGE MEDIUM

(71) Applicant: Chengdu Haiguang Integrated Circuit Design Co., Ltd., Sichuan Province (CN)

(72) Inventors: Chunhui Zhang, Austin, TX (US); Leigang Kou, Austin, TX (US); Jiang Lin, Austin, TX (US); Jing Li, Sichuan (CN); Zehan Cui, Sichuan (CN)

(73) Assignee: CHENGDU HAIGUANG INTEGRATED CIRCUIT DESIGN CO., LTD., Sichuan (CN)

( * ) Notice: Subject to any disclaimer, the term of this patent is extended or adjusted under 35 U.S.C. 154(b) by 94 days.

(21) Appl. No.: 16/389,135

(22) Filed: Apr. 19, 2019

(65) Prior Publication Data

US 2020/0334160 A1 Oct. 22, 2020

(51) Int. Cl.
*G06F 12/0871* (2016.01)
*G06F 9/50* (2006.01)
*G06F 11/30* (2006.01)
*G06K 9/62* (2006.01)

(52) U.S. Cl.
CPC ........ *G06F 12/0871* (2013.01); *G06F 9/5016* (2013.01); *G06F 11/3037* (2013.01); *G06K 9/6267* (2013.01)

(58) Field of Classification Search
None
See application file for complete search history.

(56) References Cited

U.S. PATENT DOCUMENTS

| | | | | |
|---|---|---|---|---|
| 7,856,530 B1* | 12/2010 | Mu | ..................... | G06F 12/0888 711/119 |
| 2008/0235457 A1* | 9/2008 | Hasenplaugh | ...... | G06F 12/0842 711/130 |
| 2016/0182345 A1* | 6/2016 | Herdrich | ............... | G06F 12/084 709/224 |
| 2017/0094377 A1* | 3/2017 | Herdrich | ............. | H04L 41/5009 |
| 2017/0337135 A1* | 11/2017 | Hu | ...................... | G06F 16/9024 |
| 2018/0217938 A1* | 8/2018 | Chandran | ............... | G06F 12/12 |
| 2018/0321979 A1* | 11/2018 | Bahramshahry | ........ | G06F 9/505 |
| 2019/0034326 A1* | 1/2019 | Nalluri | ...................... | G06T 1/60 |
| 2019/0044828 A1* | 2/2019 | Gasparakis | ......... | G06F 9/45558 |
| 2019/0356731 A1* | 11/2019 | Bivens | ................ | H04L 41/0823 |

* cited by examiner

*Primary Examiner* — Charles Rones
*Assistant Examiner* — Ryan Dare
(74) *Attorney, Agent, or Firm* — Barnes & Thornburg LLP; G. Peter Nichols

(57) ABSTRACT

A cache management method for a computing device, a cache controller, a processor and a processor readable storage medium are disclosed. The cache management method for the computing device includes classifying a workload on a cache based on a cache architecture of the computing device, characteristics of a cache level of the cache and a difference in the workload on the cache, and configuring a priority for the classified workload; and allocating a cache resource and performing cache management according to the configured priority.

14 Claims, 4 Drawing Sheets

CACHE MANAGEMENT METHOD, CACHE CONTROLLER, PROCESSOR AND STORAGE MEDIUM

TECHNICAL FIELD

Embodiments of the present disclosure relate to the technical field of cache management, in particular to a cache management method, a cache controller, a processor and a storage medium.

BACKGROUND

As for computing devices, the use of cache to store frequently accessed data and their addresses is a method to effectively increase the running speed of the computing devices. The cache architecture is traditionally designed for a single application, thread or core. The workloads of multi-threaded (MT) and multi-core (chip-multiprocessor (CMP)) platform architectures range from single-threaded and multi-threaded applications to complex virtual machines (VMs). These heterogeneous workloads have different localities and different cache sensitivities. Therefore, even for applications with good locality, the cache management method that treats all the cache accesses equally will also result in low space utilization and poor performance.

Currently, in order to improve the Quality of Service (QoS) of the computing device, a corresponding cache management scheme is applied to the last level cache (LLC) of the processor.

However, the QoS of the cache management scheme still needs to be improved.

SUMMARY

At least one embodiment of the present disclosure discloses a cache management method for a computing device, comprising:

classifying a workload on a cache based on a cache architecture of the computing device, characteristics of a cache level of the cache and a difference in the workload on the cache, and configuring a priority for the classified workload; and allocating a cache resource and performing cache management according to the configured priority.

For example, the cache management method according to some embodiments of the present disclosure further comprises: monitoring a resource allocation status of the cache, and adjusting a resource allocation of the cache according to a monitoring result.

For example, the adjusting the resource allocation of the cache according to the monitoring result and performing the cache management comprises at least one of:

adjusting a classification method of the workload on the cache according to the monitoring result, and configuring the priority for the workload according to the adjusted classification method; or adjusting the priority of the workload on the cache according to the monitoring result.

For example, the cache management method according to some embodiments of the present disclosure further comprises: monitoring resource allocation statuses of a plurality of cache levels of the computing device, and adjusting a resource allocation of one or more corresponding cache levels according to a monitoring result.

For example, in the cache management method according to some embodiments of the present disclosure, the adjusting the resource allocation of one or more corresponding cache levels according to the monitoring result comprises:

executing at least one of the following adjusting operations in case of monitoring that a cache allocation on a cache level does not meet a preset cache quality of service (QoS) requirement:

adjusting a cache resource allocation of the cache level; or adjusting a cache resource allocation of at least one cache level above the cache level.

For example, in the cache management method according to some embodiments of the present disclosure, wherein the adjusting the resource allocation of one or more corresponding cache levels according to the monitoring result comprises at least one of:

adjusting a classification method of the workload on the cache level according to the monitoring result, and configuring the priority for the workload according to the adjusted classification method;

adjusting the priority of the workload on the cache level according to the monitoring result;

adjusting a classification method of a workload of at least one cache level above the cache level according to the monitoring result, and configuring the priority for the workload according to the adjusted classification method; or adjusting the priority of a workload of at least one cache level above the cache level according to the monitoring result.

For example, in the cache management method according to some embodiments of the present disclosure, the classifying the workload on the cache based on the cache architecture of the computing device, the characteristics of the cache level of the cache and the difference in the workload on the cache comprises at least one of:

classifying the workload on the cache based on an application;

classifying the workload on the cache based on a core;

classifying the workload on the cache based on a thread;

classifying the workload on the cache based on an involved data structure type;

classifying the workload on the cache based on a transaction or a stage of an application;

classifying the workload on the cache based on a type of a data access; or classifying the workload on the cache based on a source of an access.

For example, in the cache management method according to some embodiments of the present disclosure, the allocating the cache resource according to the configured priority and performing cache management comprises at least one of:

executing a preset cache space management strategy on a corresponding workload according to the configured priority; or executing a preset age-based priority strategy on a corresponding cache line of a corresponding workload according to the configured priority.

For example, in the cache management method according to some embodiments of the present disclosure, the executing the preset cache space management strategy on the corresponding workload according to the configured priority comprises at least one of:

setting a corresponding cache partition for the corresponding workload according to the configured priority;

setting a number of an occupied cache line for the corresponding workload according to the configured priority; or allocating a cache of a corresponding structure type for the corresponding workload according to the configured priority.

For example, in the cache management method according to some embodiments of the present disclosure, the computing device comprises a processor; the processor comprises a plurality of physical cores and a shared cache coupled with the plurality of physical cores; and the physical core comprises at least one middle level cache (MLC).

For example, in the cache management method according to some embodiments of the present disclosure, the classifying the workload on the cache based on the cache architecture of the computing device, the characteristics of the cache level of the cache and according to the difference in the workload on the cache, and configuring the priority configuration for the classified workload comprises:

classifying, for the shared cache, the workload based on a thread, a core, or the source of the access; and classifying, for at least one MLC of the physical core, the workload based on the source of the access.

For example, in the cache management method according to some embodiments of the present disclosure, wherein the allocating the cache resource according to the configured priority and performing cache management comprises:

adopting, for the MLC, a way of instruction and data separation (IDS) for storage.

For example, in the cache management method according to some embodiments of the present disclosure, the cache line of the cache comprises a classification identifier of the workload which is transmitted to a next cache level.

For example, the cache management method according to some embodiments of the present disclosure, wherein the classification identifier of the workload comprises: a thread identifier (threadID) which is a hardware thread identifier (HW-thread ID) adapted to be stored in the cache line, a core identifier (CoreID), or an address space identifier (ASID), which is transmitted to the next cache level together with the cache line.

For example, the cache management method according to some embodiments of the present disclosure further comprises: feeding back a cache management method adopted by the computing device in case of receiving a preset cache management function query instruction.

At least one embodiment of the present disclosure discloses a cache controller, comprising:

a classification unit configured to classify a workload on a cache based on a cache architecture, characteristics of a cache level of the cache and a difference in the workload on the cache; and a priority configuration unit configured to configure a priority for the classified workload.

For example, the cache controller according to some embodiments of the present disclosure further comprises:

a first monitoring unit configured to monitor a resource allocation status of the cache; and a first adjusting unit configured to adjust a resource allocation of the cache according to a monitoring result.

For example, in the cache controller according to some embodiments of the present disclosure, the first adjusting unit comprises at least one of:

a first adjusting sub-unit configured to adjust a classification method of the workload on the cache according to the monitoring result and configure the priority for the workload according to the adjusted classification method; or a second adjusting sub-unit configured to adjust the priority of the workload on the cache according to the monitoring result.

For example, the cache controller according to some embodiments of the present disclosure further comprises:

a second monitoring unit configured to monitor resource allocation statuses of a plurality of cache levels; and a second adjusting unit configured to adjust a resource allocation of one or more corresponding cache levels according to a monitoring result of the second monitoring unit.

For example, in the cache controller according to some embodiments of the present disclosure, the second adjusting unit comprises at least one of:

a third adjusting sub-unit configured to adjust a cache resource allocation of the cache level in an event that the second monitoring unit monitors that the cache allocation on a cache level does not meet a preset cache QoS requirement; or a fourth adjusting sub-unit configured to adjust a cache resource allocation of at least one cache level above a cache level in an event that the second monitoring unit monitors that the cache allocation on the cache level does not meet the preset cache QoS requirement.

For example, in the cache controller according to some embodiments of the present disclosure, the third adjusting sub-unit is configured to execute at least one of the following: adjusting a classification method of the workload on the cache level according to the monitoring result, and configuring the priority for the workload according to the adjusted classification method; or adjusting the priority of the workload on the cache level according to the monitoring result.

For example, in the cache controller according to some embodiments of the present disclosure, the fourth adjusting sub-unit is configured to execute at least one of the following: adjusting a classification method of the workload of at least one cache level above the cache level according to the monitoring result, and configuring the priority for the workload according to the adjusted classification method; or adjusting the priority of a workload of at least one cache level above the cache level according to the monitoring result.

For example, in the cache controller according to some embodiments of the present disclosure, the classification unit comprises at least one of:

a first classification sub-unit configured to classify the workload on the cache based on an application;

a second classification sub-unit configured to classify the workload on the cache based on a core;

a third classification sub-unit configured to classify the workload on the cache based on a thread;

a fourth classification sub-unit configured to classify the workload on the cache based on an involved data structure type;

a fifth classification sub-unit configured to classify the workload on the cache based on a transaction or a stage of an application;

a sixth classification sub-unit configured to classify the workload on the cache based on a type of a data access; or a seventh classification sub-unit configured to classify the workload on the cache based on a source of an access.

For example, in the cache controller according to some embodiments of the present disclosure, the cache management unit comprises at least one of:

a space management sub-unit configured to execute a preset cache space management strategy on a corresponding workload according to the configured priority; or an age management sub-unit configured to execute a preset age-based priority strategy on a corresponding cache line of a corresponding workload according to the configured priority.

At least one embodiment of the present disclosure discloses a processor, comprising:

a plurality of physical cores;

a plurality of levels of caches comprising a shared cache coupled between the plurality of physical cores and at least one MLC disposed inside the physical core; and a cache controller configured to classify a workload on the cache based on a cache architecture of the processor, characteristics of a cache level and a difference in the workload on the cache, configure a priority for the classified workload, and allocate a cache resource according to the configured priority and perform cache management.

For example, in the processor according to some embodiments of the present disclosure, the cache controller is also configured to monitor a resource allocation status of the cache and adjust a resource allocation of the cache according to a monitoring result.

For example, in the processor according to some embodiments of the present disclosure, the cache controller is configured to execute at least one of the following:

adjusting the priority of the workload on the cache according to the monitoring result; and adjusting a classification method of the workload on the cache according to the monitoring result, and configuring the priority for the workload according to the adjusted classification method.

For example, in the processor according to some embodiments of the present disclosure, the cache controller is also configured to monitor resource allocation statuses of a plurality of cache levels of the processor and adjust a resource allocation of one or more corresponding cache levels according to a monitoring result.

For example, in the processor according to some embodiments of the present disclosure, the cache controller is configured to execute at least one of following adjusting operations in case of monitoring that a cache allocation on a cache level does not meet a preset cache QoS requirement:

adjusting a cache resource allocation of the cache level; or adjusting a cache resource allocation of the cache of at least one cache level above the cache level.

For example, in the processor according to some embodiments of the present disclosure, the cache controller is configured to execute at least one of the following:

adjusting a classification method of the workload on the cache level according to the monitoring result, and configuring the priority for the workload according to the adjusted classification method;

adjusting the priority of the workload on the cache level according to the monitoring result;

adjusting a classification method of a workload of at least one cache level above the cache level according to the monitoring result, and configuring the priority for the workload according to the adjusted classification method; or adjusting the priority of a workload of at least one cache level above the cache level according to the monitoring result.

For example, in the processor according to some embodiments of the present disclosure, the cache controller is configured to execute at least one of following classification methods:

classifying the workload on the cache based on an application;

classifying the workload on the cache based on a core;

classifying the workload on the cache based on a thread;

classifying the workload on the cache based on a transaction or a stage of an application;

classifying the workload on the cache based on a type of a data access; or classifying the workload on the cache based on a source of an access.

For example, in the processor according to some embodiments of the present disclosure, the cache controller is configured to allocate the cache resource and perform cache management according to at least one of following means:

executing a preset cache space management strategy on a corresponding workload according to the configured priority; or executing a preset age-based priority strategy on a corresponding cache line of a corresponding workload according to the configured priority.

For example, in the processor according to some embodiments of the present disclosure, the cache controller is configured to execute at least one of following cache space management strategies:

setting a corresponding cache partition for the corresponding workload according to the configured priority;

setting a number of an occupied cache line for the corresponding workload according to the configured priority; or allocating a cache of a corresponding structure type for the corresponding workload according to the configured priority.

For example, in the processor according to some embodiments of the present disclosure, the cache controller is configured to classify the workload of the shared cache based on a thread, a core, or the source of the access; and classify the workload of the MLC based on the source of the access.

For example, in the processor according to some embodiments of the present disclosure, the cache controller is configured to control the MLC to adopt a way of IDS for storage.

For example, in the processor according to some embodiments of the present disclosure, the cache line of the cache comprises a classification identifier of the workload which is transmitted to a next cache level.

For example, in the processor according to some embodiments of the present disclosure, the classification identifier of the workload comprises a threadID which is an HW-thread ID adapted to be stored in the cache line, a CoreID, or an ASID which is transmitted to the next cache level together with the cache line.

For example, the processor according to some embodiments of the present disclosure further comprises: a function feedback interface configured to feed back a cache management function supported by the processor in case of receiving a preset cache management function query instruction.

At least one embodiment of the present disclosure discloses a processor readable storage medium, storing instructions which when executed by a processor, causes the processor to execute the above-mentioned cache management method.

DETAILED DESCRIPTION

Figure 1:
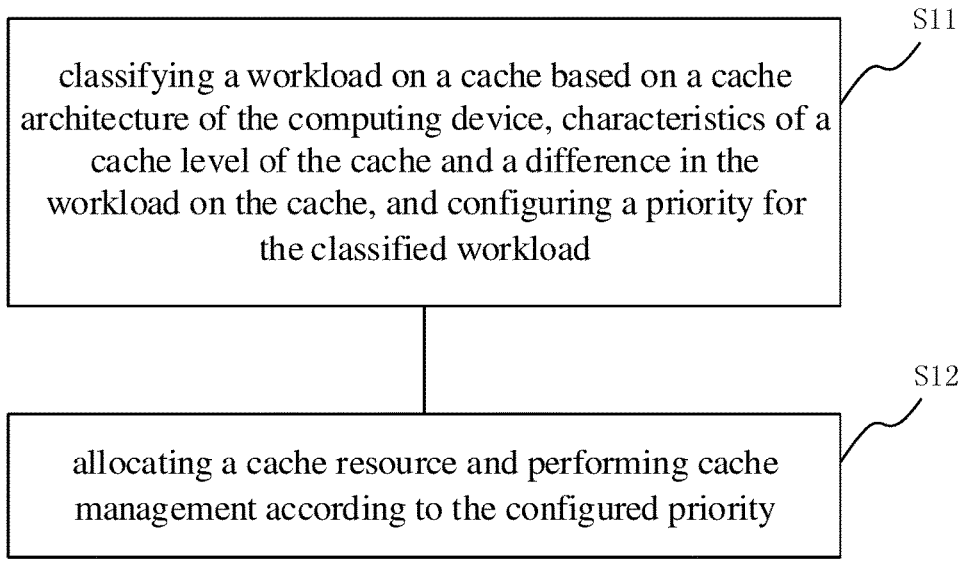
FIG. 1 is a flowchart of a cache management method for a computing device provided by at least one embodiment of the present disclosure.

As described above, currently, as for computing devices such as multi-core processors, cache management is basically applied for LLC, for instance, a QoS management scheme which applies preset cache allocation strategy and Instruction Data Separation (IDS) to LLC. Currently, the QoS of cache management in the above solution still needs to be improved.

In order to improve the QoS of cache management, the embodiments of the present disclosure do not independently manage a certain cache level but distributes cache management to multiple levels of the cache hierarchy by considering the overall cache architecture, the characteristics of the level of the cache, and the difference in the workloads on the cache, and hence different QoS demand of the workloads can be met and the overall QoS of individual levels of caches can be improved.

For those skilled in the art to better understand and implement the embodiments of the present disclosure, detailed description will be given below to the specific steps with reference to the accompanying drawings.

S11: Classifying workloads on a cache based on the cache architecture of a computing device, the characteristics of the level of the cache and the difference in the workloads on the cache, and performing corresponding priority configuration on the classified workloads.

In specific implementations, the workloads on the cache may be classified by proper means based on the cache architecture of the computing device, the characteristics of the level of the cache and the difference in the workloads on the cache. In some embodiments of the present disclosure, as for a certain cache level, the workloads may be classified by one or more of the following classification methods:

1) Application-Based Classification:

In practice, the computing device such as a cloud service center may handle emails, web pages, files, audios and videos, or various applications (APPs), and different APPs may have different QoS requests. In some embodiments of the present disclosure, classification may be made based on different APPs, or classification may also be made based on different characteristics of APPs or based on different types of APPs. For instance, if a plurality of APPs as a whole is isomorphic to a great extent, the APPs can be classified as one category and configured with same priority level.

2) Core-Based Classification:

In specific implementations, classification may be made according to the performance difference, the structure difference or different functions of cores. For instance, as for multi-core shared caches, special kernels helping the APPs and the kernels for major APPs may be classified into different categories and configured with different priority levels.

3) Thread-Based Classification:

In specific implementations, threads may be classified according to the latency demand of the threads and the difference in latency, and the threads of which the latency demand is within the same interval are classified in one category and configured with corresponding priority levels.

4) Classification Based on Involved Data Structure Type:

The data structures relevant to typical cache access in the running process of the computing device flows may be divided into three types according to the access frequency: (1) frequent type; (2) general type; and (3) unpopular data. In specific implementations, an APP developer or a compiler may analyze the APP and identify the data structure type involved in the APP, and corresponding priorities may be configured for the workloads of different data structure types.

5) Classification Based on the Transaction or the Stage of an APP:

In specific implementations, the developer may configure corresponding priority for each stage or transaction handled by the APP.

6) Classification Based on the Type of the Data Access:

For instance, whether the workload is pre-fetch flow or access flow may be distinguished. Higher priority level may be configured for the access flow.

7) Classification Based on the Source of the Access:

In specific implementations, program segments may be divided into instructions and data according to functions, and then different priorities may be configured for instruction flows and data flows.

In specific implementations, the plurality of classification methods may be independently used on a certain cache level, or numerous classification methods may be adopted as required, or the plurality of classification methods may also be used in combination.

For instance, on a certain cache level, the workloads may be classified based on the source of the access, and meanwhile, classification may also be made according to different threads. Thus, the two classification methods may be used in combination, and the priorities of different types are configured based on a uniform priority system.

In specific implementations, hardware identifies the classification identifier of the workload, e.g., the CoreID or the threadID Tid, and the cache line including the classifier identifier of the workload is stored or loaded or transmitted to the next cache level.

S12: Allocating cache resources according to the configured priorities and performing cache management.

In specific implementations, corresponding cache resource allocation strategy and cache management strategy may be set according to different priorities. For instance, preset cache space management strategy may be executed on corresponding workloads according to the configured priorities, or preset age-based priority strategy may be executed on corresponding cache lines of corresponding workloads according to the configured priorities. It could be understood that in specific implementations, two or more strategies may be combined as required, for instance, according to the fineness of priority configuration or the granularity of cache allocation.

As for any level of cache space, corresponding cache space management strategy may be flexibly set as required. For instance, any one or more of the following may be adopted: setting corresponding cache partitions for corresponding workloads according to the configured priorities; setting the number of occupied cache lines for corresponding workloads according to the configured priorities; and allocating the cache of a corresponding structure type for corresponding workloads according to the configured priorities, for example, a set-associative cache, a stream buffer or a victim cache/buffer.

The embodiments of the present disclosure distribute cache management to multiple levels of the cache hierarchy by considering the overall cache architecture, the characteristics of the level of the cache, and the difference in the workloads on the cache, and hence may optimize the cache allocation and management scheme, meet different QoS demands of the workloads, and improve the overall QoS of individual levels of caches. Moreover, as the cache management is based on the overall cache architecture, the cache management may be adapted to changes in cache topology and hence has strong flexibility and expandability. In addition, the complexity of software or hardware control may also be reduced.

In some embodiments of the present disclosure, the computing device may include a processor; the processor may include a plurality of physical cores and shared caches coupled with the plurality of physical cores; and the physical core includes at least one middle level cache (MLC). The method provided by the above embodiments may be adopted to manage the caches of the processor, optimize the QoS of the caches, and improve the flexibility and the expansibility of the cache management scheme.

Figure 2:
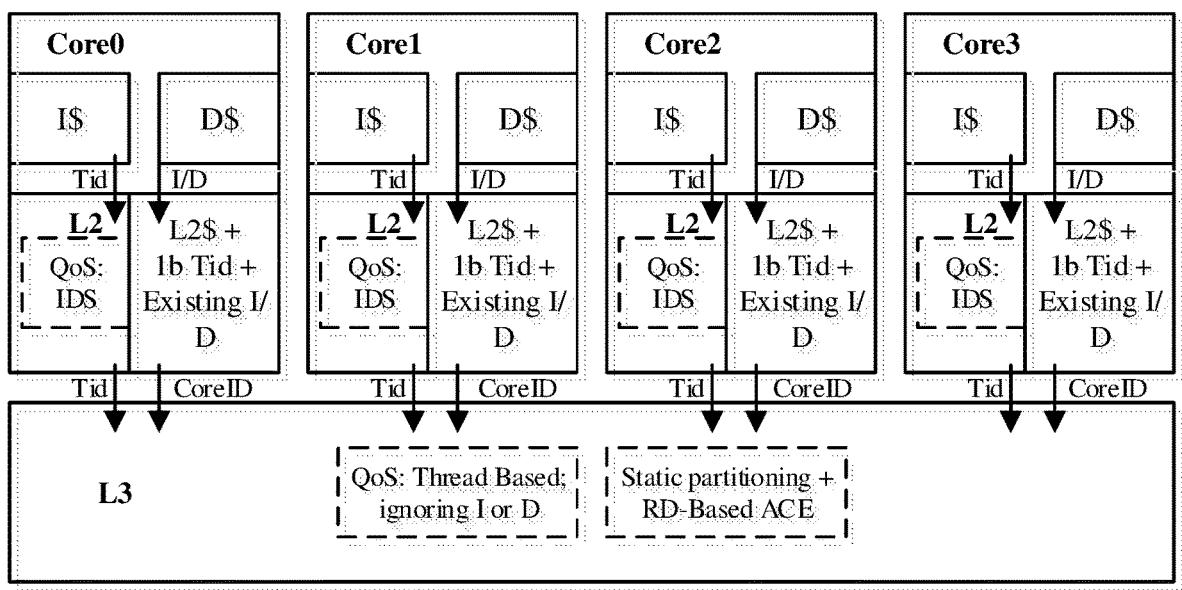
FIG. 2 is a structural schematic diagram of a processor provided by at least one embodiment of the present disclosure.

Detailed description will be given below to a specific cache architecture of one processor. As shown in FIG. 2 which is a schematic architecture diagram of the processor, the processor comprises a core 0, a core 1, a core 2 and a core 3, four cores in total; the inside of each core respectively includes a level 1 cache L1 and a level 2 cache L2; and the cores share an LLC. The level 1 cache L1 adopts IDS strategy, and instructions I and data D are separated and stored, so the level 1 cache L1 includes a level 1 instruction cache L1I and a level 1 data cache L1D.

As known by the study on the cache architecture in the processor, although the level 2 cache L2 is a private cache to the processor, the level 2 cache L2 is a shared cache to the level 1 instruction cache L1I and the level 1 data cache L1D. The level 2 cache L2 is also shared by two threads running in the core. The access latencies of the caches L2 and L3 are very significant. For instance, the access latency of the cache L2 may be 12 clock cycles, and the access latency of the cache L3 may be 34 clock cycles.

The above 3-level cache architecture and simultaneous multi-threading (SMT) are quite generic in today's top-tier processors. As for the processor with the above architecture, in some embodiments of the present disclosure, considering the cache architecture and different characteristics of each cache level, appropriate cache allocation and management strategies may be adopted.

Specifically, in the level 2 cache L2, the workloads may be classified based on the source of the access, namely storage is made by adoption of IDS means and corresponding cache partitions may be allocated for instructions and data according to the configured priorities. In the level 2 cache L2, classification may be also made based on threads; different priorities are configured for different threads; and the threads with different priorities correspond to different latencies.

As for the shared cache L3, which cache management strategy is based may be selected at a larger degree of freedom. For instance, cache management may be performed based on different threads, and instruction or data difference may be ignored; or cache management may be performed according to different cores; or cache management may be made according to the source of the access (classified into instructions or data); or static partitioning is adopted and the advanced cryptography engine (ACE) based on re-reference interval prediction distance (RD) (RD-Based ACE) function is supported.

It could be understood that the foregoing is only illustrative and not intended to limit the cache management strategy adopted in the embodiments of the present disclosure. For instance, as for the MLC such as L2, cache management may be performed according to different APPs, or cache management may be performed according to different sources of the access; classification may be made according to different APPs, or classification may be made according to involved data structure type, etc. Classification may be made according to the cache levels or the characteristics of the workloads, as long as the cache resource utilization may be optimized and the QoS of the cache may be improved.

Similarly, as for the shared cache between the cores (e.g., the LLC), the workloads may also be classified according to the characteristics of the workloads and the cache QoS requirement, and corresponding cache management is performed. It should be noted that among a plurality of cache levels, the cache of each level has a larger degree of freedom in cache management classification and resource configuration process compared with the cache of an upper level, and more reasonable allocation and dispatching may be made to the resources of this level cache according to the resource allocation status of the upper level or multiple levels. Thus, as for the threads of one APP, cache management may be performed in the caches of each level where the thread runs, so the all-around cache management may be realized across the levels, and closed-ring control may be also performed on the resource application during the life cycle of the application, and hence the refined management of the cache QoS may be realized.

In order for each level of the cache architecture to have a larger degree of freedom and flexibility in cache management, corresponding workload classification identifiers may be set in corresponding cache lines and transmitted to the next cache level.

In specific implementations, there may be some challenges for existing microarchitectures to adopt the embodiment of the present disclosure. For instance, during the eviction process of a middle cache, there may be a situation where the workload identifier such as the threadID Tid is lost.

Aiming to this problem, in some embodiments of the present disclosure, corresponding load classification identifiers are set in the cache lines of the MLC and may be transmitted to other cache levels along with the cache lines.

In an embodiment of the present disclosure, 1-bit thread info Tid is set in the MLC and configured to distinguish the thread to which the workload belongs. When transmitted to the next cache level, in order to reduce the overhead, the 1-bit thread info Tid may be placed in the CoreID and then transmitted to the next cache level through the CoreID along with the cache line (may include the 1-bit threadID Tid and the existing IDS identifier).

In another embodiment of the present disclosure, the classification identifier of the workload, e.g., the ASID, is transmitted by utilization of the conventional tag. As the ASID has been in the tag array, no additional storage overhead is required, so the storage resources may be saved.

Figure 3:
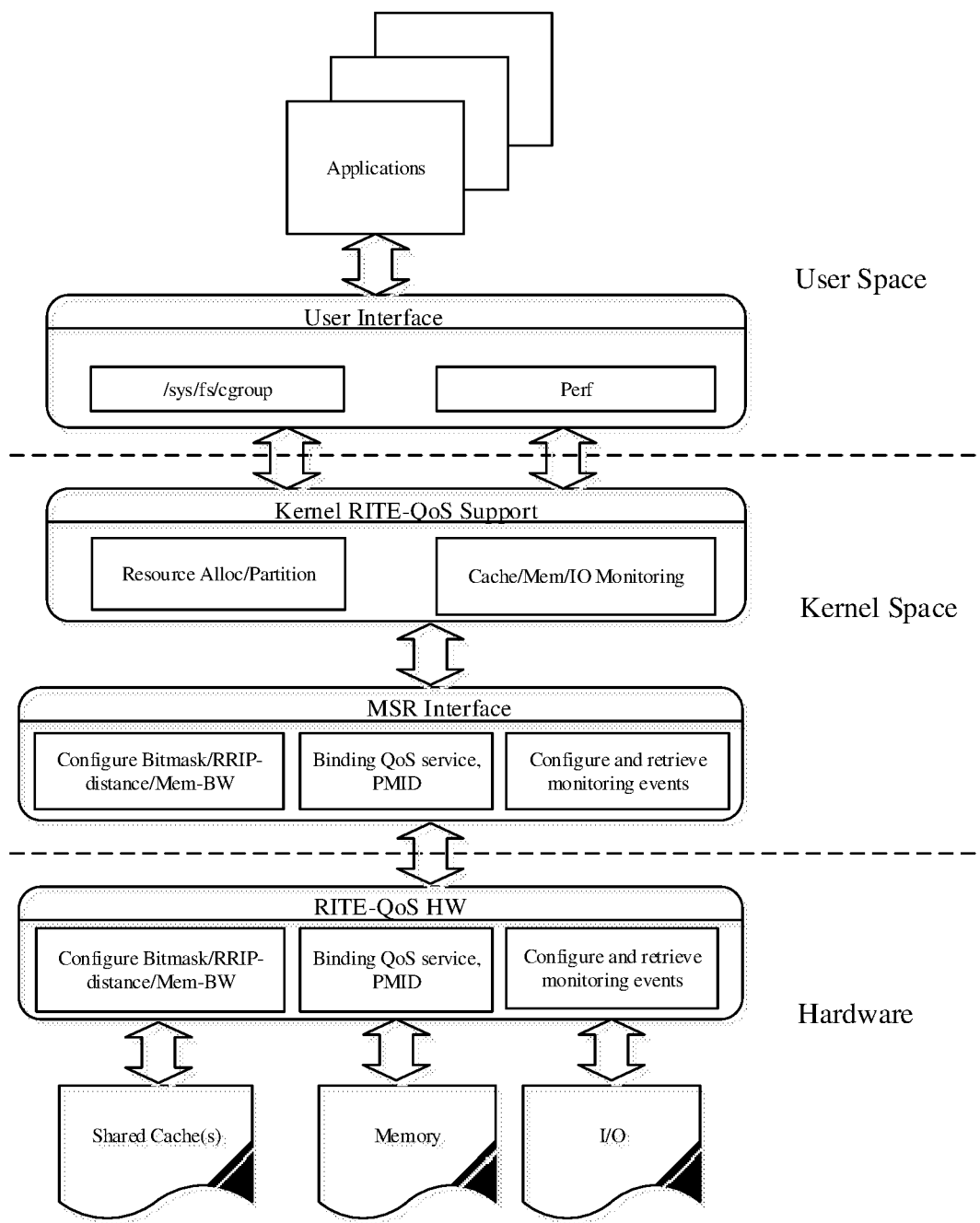
FIG. 3 is a system architecture diagram for realizing cache management by means of a combination of software and hardware in accordance with at least one embodiment of the present disclosure.

Cache-oriented QoS system architecture is relatively complex. In specific implementations, for the convenience of cache management, the resource isolation technology and engagement (RITE) technology may be adopted. The RITE technology is not just a hardware technology, instead, a system level architecture composed of hardware, a kernel support layer and a user interface layer. In some embodiments of the present disclosure, as shown in FIG. 3 which is a system architecture diagram for cache management by means of a software and hardware combination, the RITE technology allows operation systems or virtual machine managers to allocate the amount of hardware resources that an APP may use, including the capacity and location of a shared cache. Software may use CPUID to enumerate the functions of a given platform and decide what service levels are supported; and an APP may select the desired QoS level and require a system administrator to allocate the desired QoS level, as a client signing up a service level agreement (SLA) with a service provider.

Figure 4:
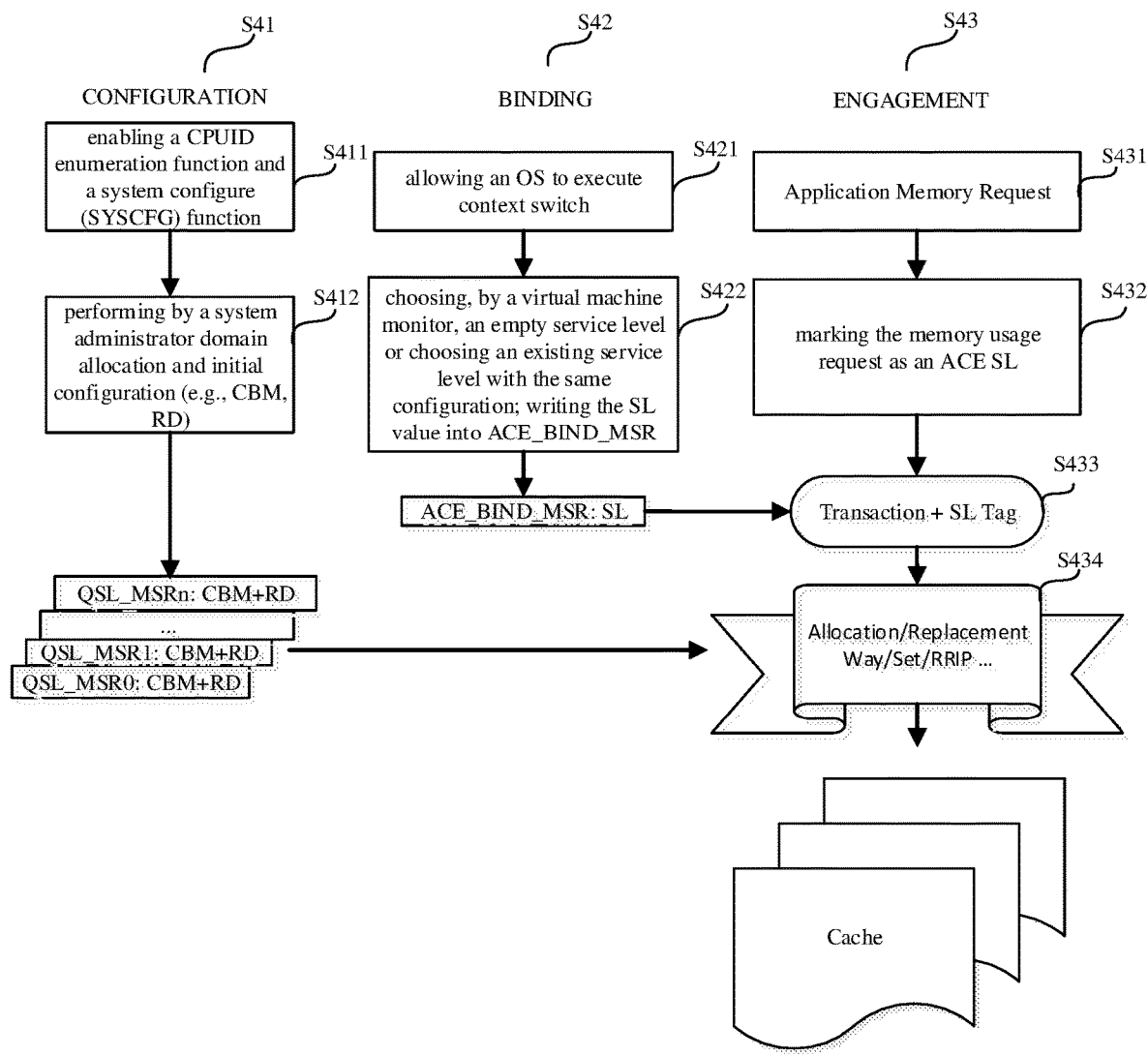
FIG. 4 is a flowchart for realizing cache management by means of a combination of software and hardware in accordance with at least one embodiment of the present disclosure.

FIG. 4 is a flowchart for realizing cache management by means of a combination of software and hardware. Detailed description will be given below with reference to FIGS. 3 and 4.

As shown in FIG. 4, the cache management by means of a combination of software and hardware may be realized through three stages.

The first stage is a system configuration stage S41. In the system configuration stage S41, the following steps may be executed:

S411: enabling a CPUID enumeration function and a system configure (SYSCFG) function; and S412: performing by a system administrator domain allocation and initial configuration, e.g., capacity bit mask (CBM) or RD, for instance, respectively configuring CBM and RD for QSL_MSR0-QSL_MSR0.

In a binding stage S42, the following steps are executed:

S421: allowing an OS to execute context switch; and

S422: choosing, by a virtual machine monitor, an empty service level or choosing an existing service level with the same configuration, and writing the service level (SL) value of ACE into the ACE_bind_mode status register (ACE_BIND_MSR).

Subsequently, an engagement stage S43 may be entered and may specifically comprise the following steps:

S431: allowing an APP to issue a memory usage request;

S432: marking the memory usage request as an ACE SL;

S433: transmitting the transaction and the ACE SL value allocated by the OS to corresponding cache together as a workload; and S434: adopting a corresponding cache allocation and management strategy according to the corresponding ACE SL value.

In the embodiment, the ACE SL corresponds to the priority level in the embodiment of the present disclosure. In specific implementations, the corresponding cache allocation and management strategy includes the allocation of cache space, the replacement way, the data set, the RRIP setting, etc.

The cache management method adopted by the computing device may be fed back when receiving a preset cache management function query instruction. In specific implementations, in order to enhance the compatibility with the conventional system, the common interface of the conventional architecture/software may be utilized for interaction. For instance, in order to enhance the compatibility with an X86 architecture, CPUID instruction may be adopted to feed back the QoS management function implemented by the embodiment of the present disclosure to developers.

The above embodiments illustrate the cache architecture of the processor including 4 cores and the cache management scheme thereof. It could be understood that in specific implementations, the number of the cores in the processor may be more than 2; the cache architectures in the cores may be the same or different; and one or more levels of shared caches may be disposed between the cores. Regardless of the number of the cores and the specific cache architecture, the cache QoS may be improved by adoption of the cache management method provided by the embodiments of the present disclosure as required.

In specific implementations, the foregoing embodiments may be also further extended. Description will be given below with reference to the specific embodiments.

In some embodiments of the present disclosure, apart from the cache management based on the overall cache architecture, the cache management scheme may also be subjected to adaptable revision according to the actual change of the cache status.

In specific implementations, the resource allocation status of the cache may be monitored, and the resource allocation of the cache may be adjusted according to the monitoring result. Specifically, the classification method of the workloads on the cache may be adjusted according to the monitoring result, and corresponding priority configuration may be performed on the workloads according to the adjusted classification method; or the priority configuration of the workloads on the cache may be adjusted according to the monitoring result. It could be understood that the above adjustment schemes may also be used in combination as required.

In specific implementations, the resource allocation status of a plurality of cache levels of the computing device may also be monitored, and the resource allocation of corresponding one or more cache levels may be adjusted according to the monitoring result. For instance, when monitoring that the cache allocation on certain cache level does not meet the preset cache QoS requirement, at least one of the following adjusting operations is executed: adjusting the resource allocation of the cache on the cache level; or adjusting the resource allocation of the cache of at least one cache level above the cache level.

In specific implementations, there may be a plurality of means for adjusting the resource allocation of corresponding one or more cache levels according to the monitoring result. For instance, one or more of the following means may be adopted as required: adjusting the classification method of the workloads on the cache level according to the monitoring result, and performing corresponding priority configuration on the workloads according to the adjusted classification method; adjusting the priority configuration of the workloads on the cache level according to the monitoring result; adjusting the classification method of the workloads of at least one cache level above the cache level according to the monitoring result, and performing corresponding priority configuration on the workloads according to the adjusted classification method; or adjusting the priority configuration of the workloads of at least one cache level above the cache level according to the monitoring result.

For those skilled in the art to better understand and implement the embodiment of the present disclosure, corresponding description will be given below to a cache controller for implementing the cache management methods provided by the embodiments of the present disclosure with reference to the accompanying drawings.

Figure 5:
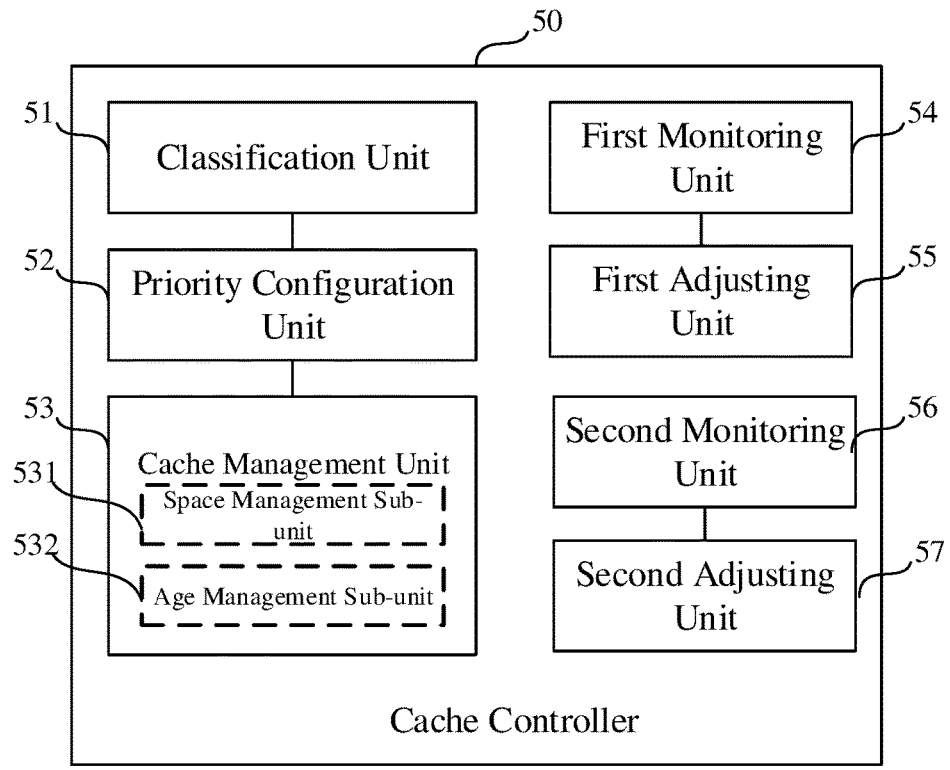
FIG. 5 is a structural schematic diagram of a cache controller provided by at least one embodiment of the present disclosure.

As shown in FIG. 5 which is a structural schematic diagram of a cache controller, the cache controller 50 provided by at least one embodiment of the present disclosure comprises: a classification unit 51, a priority configuration unit 52 and a cache management unit 53.

The classification unit 51 is configured to classify workloads on a cache based on a cache architecture, characteristics of a cache level of the cache and a difference in the workloads on the cache.

The priority configuration unit 52 is configured to perform corresponding priority configuration on the classified workloads.

The cache management unit 53 is configured to allocate cache resources according to the configured priorities and perform cache management.

By adoption of the above cache controller, cache management is distributed to multiple cache levels by considering the overall cache architecture, the characteristics of the cache level of the cache, and the difference in the workloads on the cache, thereby optimizing the cache allocation and management scheme, satisfying different QoS demands of the workloads, and improving the overall QoS of the cache levels. Moreover, as the cache management is based on the overall cache architecture, and thus the system-level cache management is realized, and the cache management may be adapted to changes in cache topology, and hence has strong flexibility and scalability.

In specific implementations, as shown in FIG. 5, the cache controller 50 may further comprise: a first monitoring unit 54 configured to monitor the resource allocation status of the cache; and a first adjusting unit 55 configured to adjust the resource allocation of the cache according to the monitoring result.

In specific implementations, the first adjusting unit 55 may include at least one of the following:
a first adjusting sub-unit (not shown) configured to adjust the classification method of the workloads on the cache according to the monitoring result, and perform corresponding priority configuration on the workloads according to the adjusted classification method; or
a second adjusting sub-unit (not shown) configured to adjust the priority configuration of the workloads on the cache according to the monitoring result.

In specific implementations, as shown in FIG. 5, the cache controller 50 may further comprise: a second monitoring unit 56 configured to monitor the resource allocation status of the cache levels; and a second adjusting unit 57 configured to adjust the resource allocation of corresponding one or more cache levels according to the monitoring result of the second monitoring unit.

In specific implementations, the second adjusting unit 57 may include at least one of the following:
a third adjusting sub-unit (not shown) configured to adjust the resource allocation of the cache on the cache level when the second monitoring unit monitors that the cache allocation on certain cache level does not meet the preset cache QoS requirement; or
a fourth adjusting sub-unit configured to adjust the resource allocation of the cache of at least one cache level above the cache level when the second monitoring unit monitors that the cache allocation on certain cache level does not meet the preset cache QoS requirement.

In an embodiment of the present disclosure, the third adjusting sub-unit (not shown) is configured to execute at least one of the following: adjusting the classification method of the workloads on the cache level according to the monitoring result, and performing corresponding priority configuration on the workloads according to the adjusted classification method; and adjusting the priority configuration of the workloads on the cache level according to the monitoring result.

In an embodiment of the present disclosure, the fourth adjusting sub-unit (not shown) is configured to execute at least one of the following: adjusting the classification method of the workloads of at least one cache level above the cache level according to the monitoring result, and performing corresponding priority configuration on the workloads according to the adjusted classification method; or adjusting the priority configuration of the workloads of at least one cache level above the cache level according to the monitoring result.

The classification unit 51 may include at least one of the following: a first classification sub-unit (not shown) configured to classify the workloads on the cache based on an applications;
a second classification sub-unit (not shown) configured to classify the workloads on the cache based on a core;
a third classification sub-unit (not shown) configured to classify the workloads on the cache based on a thread;
a fourth classification sub-unit (not shown) configured to classify the workloads on the cache based on an involved data structure type;
a fifth classification sub-unit (not shown) configured to classify the workloads on the cache based on a transaction or a stage of an application;
a sixth classification sub-unit (not shown) configured to classify the workloads on the cache based on a source of an access; or
a seventh classification sub-unit (not shown) configured to classify the workloads on the cache based on the type of a data access.

In specific implementations, the cache management unit 53 may include at least one of the following: a space management sub-unit 531 configured to execute a preset cache space management strategy on corresponding workloads according to the configured priorities; or an age management sub-unit 532 configured to execute a preset age-based priority strategy on corresponding cache lines of corresponding workloads according to the configured priorities.

In specific implementations, the space management sub-unit 531 may include at least one of the following: a first space management module (not shown) configured to set corresponding cache partitions for corresponding workloads according to the configured priorities; a second space management module (not shown) configured to set the number of occupied cache lines for corresponding workloads according to the configured priorities; or a third space management module (not shown) configured to allocate the cache of a corresponding structure type for corresponding workloads according to the configured priorities.

In specific implementations, the cache line of the cache may include the classification identifier of the workload which is transmitted to the next cache level.

In an embodiment of the present disclosure, the classification identifier of the workload includes a threadID which is an hardware-thread identifier (HW-thread ID) stored in the cache line, a core identifier (CoreID), or an address space identifier (ASID) which is transmitted to the next cache level together with the cache line.

At least one embodiment of the present disclosure further provides a processor employing the above cache management method. Corresponding description will be given below with reference to the preferred embodiments.

Figure 6:
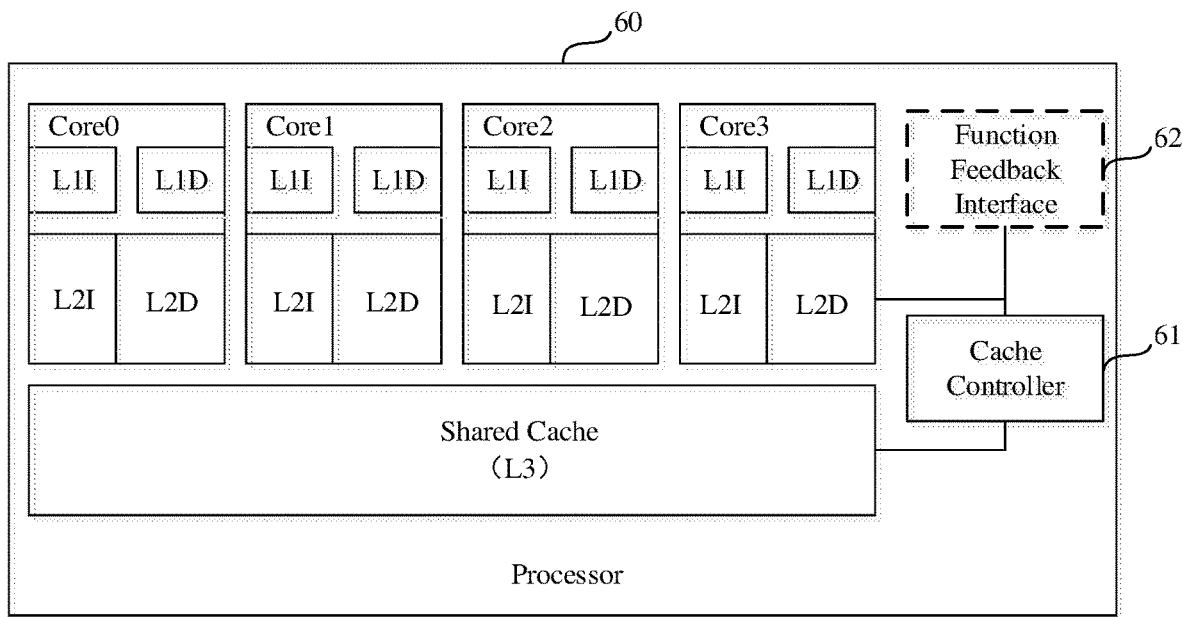
FIG. 6 is a structural schematic diagram of a processor provided by at least one embodiment of the present disclosure.

As shown in FIG. 6 which is a structural schematic diagram of the processor, in some embodiments of the present disclosure, the processor 60 may comprise: a plurality of physical cores (e.g. core 0-4); a plurality of levels of caches (L1, L2 and L3) including a shared cache (e.g., L3) coupled between the plurality of physical cores and at least one MLC (e.g., L2) disposed in the physical core; and a cache controller 61 configured to classify workloads on the cache based on the cache architecture of the processor, the characteristics of the cache level and the difference in the workloads on the cache, perform corresponding priority configuration on the classified workloads, and allocate cache resources according to the configured priorities and perform cache management.

In specific implementations, the cache controller 61 is also configured to monitor the resource allocation status of the cache and adjust the resource allocation of the cache according to the monitoring result. For instance, the cache controller 61 is configured to adjust the priority configuration of the workloads on the cache according to the monitoring result; and/or adjust the classification method of the workloads on the cache according to the monitoring result, and perform corresponding priority configuration on the workloads according to the adjusted classification method.

In specific implementations, the cache controller 61 is also configured to monitor the resource allocation status of a plurality of cache levels of the processor and adjust the resource allocation of one or more corresponding cache levels according to the monitoring result. For instance, the cache controller is configured to execute at least one of the following adjusting operations when monitoring that the cache allocation on a certain cache level does not meet the preset cache QoS requirement: adjusting the resource allocation of the cache on the cache level; or adjusting the resource allocation of the cache of at least one cache level above the cache level.

In specific implementations, the cache controller 61 is configured to execute at least one of the following:
adjusting the classification method of the workloads on the cache level according to the monitoring result, and performing corresponding priority configuration on the workloads according to the adjusted classification method;
adjusting the priority configuration of the workloads on the cache level according to the monitoring result;
adjusting the classification method of the workloads of at least one cache level above the cache level according to the monitoring result, and performing corresponding priority configuration on the workloads according to the adjusted classification method; or
adjusting the priority configuration of the workloads of at least one cache level above the cache level according to the monitoring result.

In specific implementations, the cache controller 61 is configured to execute at least one of the following classification methods:
classifying the workloads on the cache based on an application;
classifying the workloads on the cache based on a core;
classifying the workloads on the cache based on a thread;
classifying the workloads on the cache based on an involved data structure type;
classifying the workloads on the cache based on a transaction or a stage of an APP;
classifying the workloads on the cache based on the type of a data access; or
classifying the workloads on the cache based on the source of an access.

In specific implementations, the cache controller 71 is configured to allocate the cache resources and perform cache management according to at least one of the following means: executing a preset cache space management strategy on corresponding workloads according to the configured priorities; or executing a preset age-based priority strategy on corresponding cache lines of corresponding workloads according to the configured priorities.

In specific implementations, the cache controller 71 is configured to execute at least one of the following cache space management strategies:
setting corresponding cache partitions for corresponding workloads according to the configured priorities;
setting the number of occupied cache lines for corresponding workloads according to the configured priorities; or
allocating the cache of a corresponding structure type for corresponding workloads according to the configured priorities.

In specific implementations, the cache controller 71 is configured to classify the workloads of the shared cache based on threads, based on cores, or based on the source of the access; and classify the workloads of the MLC based on the source of the access.

In specific implementations, the cache controller 73 is configured to control the MLC to adopt the means of IDS for storage.

In specific implementations, the cache line of the cache may include the classification identifier of the workload which is transmitted to the next cache level. For instance, the classification identifier of the workload may include a threadID which is an HW-thread ID stored in the cache line, a CoreID, or ASID which is transmitted to the next cache level.

In specific implementations, in order to enhance the compatibility with the existing X86 system architecture, as shown in FIG. 6, the processor may further comprise: a function feedback interface 62 which is configured to feed back the cache management function supported by the processor when receiving a preset cache management function query instruction.

In an embodiment of the present disclosure, as for the X86 system architecture, the function feedback interface 62 is configured to feed back the software control function based on shared processor resources, supported by the processor, by outputting the value of bit 15 of EBX of corresponding CPUID as 1 when receiving the CPUID instruction with EAX=07H, ECX=0H; enumerate additional details of available resource types, classes of services and capability bitmasks through the leaf 10H of the CPUID instruction; and feed back IDS supported by corresponding MLC by outputting bit 2 of ECX of corresponding CPUID as 1 when receiving the CPUID instruction with EAX=10H, ECX=2.

In the embodiments of the present disclosure, the workload on the cache is classified based on the cache architecture of the computing device and the characteristics of the level of the cache and according to the difference in the workload on the cache; a priority is configured for the classified workload; and the cache resource is allocated according to the configured priority and cache management is performed. As the solution does not independently manage a certain cache level but distributes cache management to multiple levels of the cache hierarchy by considering the overall cache architecture, the characteristics of the level of the cache, and the difference in the workload on the cache, the solution may optimize the cache allocation and management scheme, satisfy different QoS demands of the workload, and improve the overall QoS of individual levels of caches. Moreover, as cache management is based on the overall cache architecture, the solution may realize system-level cache management and may be adapted to changes in cache topology, and hence has strong flexibility and scalability.

Moreover, the resource allocation status of the cache is monitored, and the resource allocation of the cache is adjusted according to the monitoring result, so adaptive change may be made according to the change in the workloads on the cache. Therefore, the cache management scheme has strong adaptability, maintains the stability of the QoS of caches, and hence may also improve the flexibility of the business processed by the computing device.

Moreover, the classification method of the workload on the cache is adjusted according to the monitoring result, and corresponding priority configuration is performed on the workloads according to the adjusted classification method, so as to adapt to the change in the type of the workloads. Therefore, the cache management method has strong adaptability and reliability and maintains the stability of the QoS of caches.

Moreover, the priority configuration of the workload on the cache is adjusted according to the monitoring result, so as to adapt to the change in the priority level of the workload. Therefore, the adaptability and the reliability of the cache management scheme may be improved, and the stability of the QoS of caches may be maintained.

Moreover, the resource allocation statuses of a plurality of cache levels of the computing device are monitored, and the resource allocation of one or more corresponding cache levels is adjusted according to the monitoring result, so the overall cache performance of the computing device may be optimized. Therefore, the overall cache performance of the computing device may be optimally exerted while the QoS of the workload is guaranteed.

Moreover, if an event that the cache allocation on a certain cache level does not meet the preset cache QoS requirement is monitored, the resource allocation of the cache of at least one cache level above the cache level is adjusted, so as to reduce the resource allocation and management pressure on the cache level and exert the synergistic effect of the plurality of cache levels.

Moreover, based on the cache architecture of the computing device, the characteristics of the level of the cache and the difference in the workload on the cache, the workload on the cache may be classified based on an application, based on a core, based on a thread, based on an involved data structure type, based on a transaction or a stage of an application, based on a source of an access, or based on a type of a data access. Thus, classification may be made according to the specific characteristics of the workload, and a corresponding priority is configured, so as to meet the different QoS demands of the workload.

Moreover, a preset cache space management strategy is executed on the corresponding workload according to the configured priority, so as to improve the utilization efficiency of the cache space; and a preset age-based priority strategy is executed on the corresponding cache line of the corresponding workload according to the configured priority, so as to meet the different QoS demand of the workload.

Moreover, a corresponding cache partition are set for the corresponding workload according to the configured priority, or the number of occupied cache lines is set for the corresponding workload according to the configured priority, or the cache of a corresponding structure type is allocated for the corresponding workload according to the configured priority. Therefore, the refined management of the cache may be realized; the QoS of the cache may be further improved; and the utilization efficiency of the cache may be optimally improved.

Moreover, as for the shared cache coupled between the plurality of physical cores, the workload is classified based on the thread, based on the core, or based on the source of the access; and as for at least one MLC of the physical core, the workload is classified based on the source of the access. The cache management method fully considers the cache characteristics of the cache architecture and each level. On one hand, the QoS management pressure of the shared cache may be reduced by the QoS management of the MLC. On the other hand, the shared cache has a maximum degree of freedom in cache management configuration, so that the QoS of the cache may be improved as much as possible.

Moreover, the cache line of the cache includes the classification identifier of the workload which is transmitted to the next cache level, so the degree of freedom in cache management of the next cache level may be improved.

Moreover, the hardware threadID, the CoreID, the ASID or the like in the cache line is transmitted to the next cache level, so as to reduce the storage and bandwidth resource overhead of micro-architectures.

Moreover, the cache management method adopted by the computing device may be acquired through a preset cache management function query instruction, so that application developers may know and apply the cache management function supported by the computing device, and hence the ease of use may be enhanced and the user interactive experience may be improved.

It could be understood that the embodiments of the present disclosure may be implemented by means of software and necessary general hardware, and of course, may also be implemented through dedicated hardware, but in many cases, the former may be a preferred implementation. Based on such understanding, the technical solutions of the present disclosure are embodied in software, hardware, firmware or any combination thereof. The computer software product is stored in a readable storage medium such as a magnetic storage medium (e.g., a hard disk) or an electronic storage medium (e.g., an ROM or a flash memory) and includes a plurality of instructions for causing a computing device (which may be a computer, a server, a network device or the like) to execute the methods described in the embodiments of the present disclosure.

It could be understood by those skilled in the art that the embodiment of the present disclosure may be implemented as a method, a system, or a computer program product. Thus, the embodiments of the disclosure may be implemented in hardware, software, firmware or any combination thereof. Moreover, the embodiment of the disclosure may take the form of a computer program product implemented on one or more computer usable storage media (including but not limited to disk memories, CD-ROM, optical memories, etc.) provided with computer usable program codes.

The present disclosure is described with reference to flowcharts and/or block diagrams of methods, device (system), and computer program products provided by the embodiments of the disclosure. It is to be understood that the computer program instruction may be adopted to implement each flow and/or block in the flowchart and/or block diagram and the combination of the flows and/or blocks in the flowcharts and/or block diagrams. The computer program instructions may be provided to a processor of a general purpose computer, a special purpose computer, an embedded processor, or other programmable data processing device to obtain a machine such that instructions executed by a processor of a computer or other programmable data processing device are used to generate a device for implementing specified functions in one or more flows in the flowcharts and/or one or more blocks in the block diagrams.

The computer program instructions may also be stored in a computer readable memory that may direct a computer or other programmable data processing device to operate in a particular manner, such that the instructions stored in the computer readable memory may produce an article of manufacture comprising the instruction device. The instruction device implements the functions specified in one or more flows in the flowchart and/or one or more blocks in the block diagram. These computer program instructions may also be loaded onto a computer or other programmable data processing devices such that a series of operational steps are executed on a computer or other programmable devices to produce computer-implemented processing. Therefore, the instructions executed on a computer or other programmable devices provide steps for implementing the functions specified in one or more flows in the flowchart and/or one or more blocks in the block diagram.

Although the present disclosure has been disclosed above, the present disclosure is not limited thereto. Any change and modification may be made by those skilled in the art without departing from the spirit and scope of the disclosure Therefore, the scope of protection of the present disclosure should be determined by the scope defined by the claims.

What is claimed is:

1. A cache management method for a computing device, comprising:
    classifying a workload on a cache based on a cache architecture of the computing device, characteristics of a cache level of the cache and a difference in the workload on the cache, and configuring a priority for the classified workload; and
    allocating a cache resource and performing cache management according to the configured priority;
    monitoring resource allocation statuses of a plurality of cache levels of the computing device, and adjusting a resource allocation of one or more corresponding cache levels according to a monitoring result; and
    executing at least one of the following adjusting operations in case of monitoring that a cache allocation on a cache level does not meet a preset cache quality of service (QoS) requirement:
    adjusting a cache resource allocation of the cache level; or
    adjusting a cache resource allocation of at least one cache level above the cache level;
    wherein the adjusting the resource allocation of one or more corresponding cache levels according to the monitoring result comprises at least one of:
    adjusting a classification method of the workload on the cache level according to the monitoring result, and configuring the priority for the workload according to the adjusted classification method; or
    adjusting a classification method of a workload of at least one cache level above the cache level according to the monitoring result, and configuring the priority for the workload according to the adjusted classification method.

2. The cache management method according to claim 1, wherein the adjusting the resource allocation of one or more corresponding cache levels according to the monitoring further result comprises at least one of:
    adjusting the priority of the workload on the cache level according to the monitoring result;
    adjusting the priority of a workload of at least one cache level above the cache level according to the monitoring result.

3. The cache management method according to claim 1, wherein the classifying the workload on the cache based on the cache architecture of the computing device, the characteristics of the cache level of the cache and the difference in the workload on the cache comprises at least one of:
    classifying the workload on the cache based on an application;
    classifying the workload on the cache based on a core;
    classifying the workload on the cache based on a thread;
    classifying the workload on the cache based on an involved data structure type;
    classifying the workload on the cache based on a transaction or a stage of an application;
    classifying the workload on the cache based on a type of a data access; or
    classifying the workload on the cache based on a source of an access.

4. The cache management method according to claim 3, wherein the allocating the cache resource according to the configured priority and performing cache management comprises at least one of:
    executing a preset cache space management strategy on a corresponding workload according to the configured priority; or
    executing a preset age-based priority strategy on a corresponding cache line of a corresponding workload according to the configured priority.

5. The cache management method according to claim 4, wherein the executing the preset cache space management strategy on the corresponding workload according to the configured priority comprises at least one of:
    setting a corresponding cache partition for the corresponding workload according to the configured priority;
    setting a number of an occupied cache line for the corresponding workload according to the configured priority; or
    allocating a cache of a corresponding structure type for the corresponding workload according to the configured priority.

6. The cache management method according to claim 4, wherein the computing device comprises a processor; the processor comprises a plurality of physical cores and a shared cache coupled with the plurality of physical cores; and the physical core comprises at least one middle level cache (MLC).

7. The cache management method according to claim 6, wherein the classifying the workload on the cache based on the cache architecture of the computing device, the characteristics of the cache level of the cache and according to the difference in the workload on the cache, and configuring the priority configuration for the classified workload comprises:
    classifying, for the shared cache, the workload based on a thread, a core, or the source of the access; and
    classifying, for at least one MLC of the physical core, the workload based on the source of the access.

8. The cache management method according to claim 7, wherein the allocating the cache resource according to the configured priority and performing cache management comprises: adopting, for the MLC, a way of instruction and data separation (IDS) for storage.

9. The cache management method according to claim 7, wherein the cache line of the cache comprises a classification identifier of the workload which is transmitted to a next cache level.

10. The cache management method according to claim 9, wherein the classification identifier of the workload comprises: a thread identifier (threadID) which is a hardware thread identifier (HW-thread ID) adapted to be stored in the cache line, a core identifier (CoreID), or an address space identifier (ASID), which is transmitted to the next cache level together with the cache line.

11. The cache management method according to claim 1, further comprising: feeding back a cache management method adopted by the computing device in case of receiving a preset cache management function query instruction.

12. A cache controller, comprising:
a classification unit configured to classify a workload on a cache based on a cache architecture, characteristics of a cache level of the cache and a difference in the workload on the cache; and
a priority configuration unit configured to configure a priority for the classified workload;
a cache management unit configured to allocate a cache resource and perform cache management according to the configured priority;
a second monitoring unit configured to monitor resource allocation statuses of a plurality of cache levels; and
a second adjusting unit configured to adjust a resource allocation of one or more corresponding cache levels according to a monitoring result of the second monitoring unit;
wherein the second adjusting unit comprises at least one of:
a third adjusting sub-unit configured to adjust a cache resource allocation of the cache level in an event that the second monitoring unit monitors that the cache allocation on a cache level does not meet a preset cache QoS requirement; or
a fourth adjusting sub-unit configured to adjust a cache resource allocation of at least one cache level above a cache level in an event that the second monitoring unit monitors that the cache allocation on the cache level does not meet the preset cache QoS requirement;
the second adjusting unit is configured to execute at least one of the following:
adjusting a classification method of the workload on the cache level according to the monitoring result, and configuring the priority for the workload according to the adjusted classification method; and
adjusting a classification method of the workload of at least one cache level above the cache level according to the monitoring result, and configuring the priority for the workload according to the adjusted classification method.

13. A processor, comprising:
a plurality of physical cores;
a plurality of levels of caches comprising a shared cache coupled between the plurality of physical cores and at least one MLC disposed inside the physical core; and
a cache controller configured to classify a workload on the cache based on a cache architecture of the processor, characteristics of a cache level and a difference in the workload on the cache, configure a priority for the classified workload, and allocate a cache resource according to the configured priority and perform cache management;
monitor resource allocation statuses of a plurality of cache levels of the computing device, and adjust a resource allocation of one or more corresponding cache levels according to a monitoring result; and
execute at least one of the following adjusting operations in case of monitoring that a cache allocation on a cache level does not meet a preset cache quality of service (QoS) requirement:
adjust a cache resource allocation of the cache level; or
adjust a cache resource allocation of at least one cache level above the cache level;
wherein the adjusting the resource allocation of one or more corresponding cache levels according to the monitoring result comprises at least one of:
adjusting a classification method of the workload on the cache level according to the monitoring result, and configuring the priority for the workload according to the adjusted classification method; or
adjusting a classification method of a workload of at least one cache level above the cache level according to the monitoring result, and configuring the priority for the workload according to the adjusted classification method.

14. A non-transitory processor-readable storage medium, storing instructions which when executed by a processor, cause the processor to execute the cache management method according to claim 1.

* * * * *